(12) United States Patent
Cund et al.

(10) Patent No.: US 11,436,925 B2
(45) Date of Patent: Sep. 6, 2022

(54) MONITORING APPARATUS AND METHOD

(71) Applicant: JAGUAR LAND ROVER LIMITED, Warwickshire (GB)

(72) Inventors: Mark Cund, Coventry (GB); Simon Gilling, Coventry (GB); Paul Widdowson, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 5 days.

(21) Appl. No.: 16/704,579

(22) Filed: Dec. 5, 2019

(65) Prior Publication Data

US 2020/0111367 A1    Apr. 9, 2020

Related U.S. Application Data

(63) Continuation of application No. 14/116,181, filed as application No. PCT/EP2012/058700 on May 10, 2012, now Pat. No. 10,535,267.

(30) Foreign Application Priority Data

May 12, 2011    (GB) .................................. 1107920.9

(51) Int. Cl.
*B60T 8/32*     (2006.01)
*B60T 7/00*     (2006.01)
(Continued)

(52) U.S. Cl.
CPC ................ *G08G 1/166* (2013.01); *B60T 7/22* (2013.01); *G01S 13/58* (2013.01); *G01S 13/931* (2013.01);
(Continued)

(58) Field of Classification Search
None
See application file for complete search history.

(56) References Cited

U.S. PATENT DOCUMENTS 3,778,826 A    12/1973  Flannery et al.
5,905,457 A     5/1999  Rashid
(Continued)

FOREIGN PATENT DOCUMENTS

CN    1669852 A    9/2005
CN    1736780 A    2/2006
(Continued)

OTHER PUBLICATIONS

Search and Examination Report under Sections 17 and 18(3) for Application No. GB1107920.9, dated Sep. 13, 2011.
(Continued)

*Primary Examiner* — Adam D Tissot
(74) *Attorney, Agent, or Firm* — Carlson, Gaskey & Olds, P.C.

(57) ABSTRACT

Embodiments of the present invention provide apparatus for monitoring one or more target objects in an environment external to a host vehicle by means of at least one sensor, the apparatus being arranged to trigger at least one action responsive to the detection of prescribed relative movement between the host vehicle and the one or more target objects, wherein the apparatus is arranged to monitor one or more control inputs of the vehicle and to over-ride triggering of the at least one action such that triggering of the at least one action is not performed in the event that a prescribed movement of one or more of the control inputs is detected.

10 Claims, 1 Drawing Sheet

(51) Int. Cl.
  *G05D 13/00* (2006.01)
  *G08G 1/00* (2006.01)
  *G06F 7/00* (2006.01)
  *G08G 1/16* (2006.01)
  *G01S 13/931* (2020.01)
  *G01S 13/58* (2006.01)
  *B60T 7/22* (2006.01)
  *B60W 30/09* (2012.01)
  *B60W 10/18* (2012.01)

(52) U.S. Cl.
  CPC ............ *B60W 10/18* (2013.01); *B60W 30/09* (2013.01); *B60W 2510/205* (2013.01); *B60W 2554/4041* (2020.02); *G01S 2013/932* (2020.01); *G01S 2013/9318* (2020.01); *G01S 2013/9319* (2020.01); *G01S 2013/93185* (2020.01)

(56) References Cited

U.S. PATENT DOCUMENTS

| | | | |
|---|---|---|---|
| 6,198,992 B1* | 3/2001 | Winslow | A01B 69/008 180/443 |
| 2001/0027367 A1 | 10/2001 | Maruko et al. | |
| 2005/0133317 A1 | 6/2005 | Chen et al. | |
| 2005/0159876 A1* | 7/2005 | Sugano | B60T 7/22 701/96 |
| 2006/0097570 A1* | 5/2006 | Doerr | B60Q 9/008 303/193 |
| 2008/0167781 A1* | 7/2008 | Labuhn | B60W 30/08 701/48 |
| 2008/0234907 A1* | 9/2008 | Labuhn | B60T 7/042 701/70 |
| 2009/0135065 A1 | 5/2009 | Tsuchida et al. | |

FOREIGN PATENT DOCUMENTS

| | | | | |
|---|---|---|---|---|
| CN | 101198884 A | 6/2008 | | |
| CN | 101578533 A | 11/2009 | | |
| CN | 101910866 A | 12/2010 | | |
| DE | 2518930 A1 | 11/1976 | | |
| DE | 2900461 A1 | 7/1980 | | |
| EP | 1134137 A2 | 9/2001 | | |
| FR | 2882314 A1 | 8/2006 | | |
| GB | 1464317 A | 2/1977 | | |
| GB | 2491560 A | * 12/2012 | ............ B60T 7/12 |
| JP | H05208663 A | 8/1993 | | |
| JP | H05240075 | 9/1993 | | |
| JP | 2001233189 A | 8/2001 | | |
| JP | 2008265468 | 11/2008 | | |
| JP | 2010030396 A | 2/2010 | | |
| WO | 2011098431 A1 | 8/2011 | | |

OTHER PUBLICATIONS

Extended European Search Report for Application No. EP 17 15 6839 dated Sep. 11, 2017.
International Search Report for International Application No. PCT/EP2012/058700 dated Jul. 10, 2013.
Patent Office of the People's Republic of China, First Search Report, Patent Application No. 2016-102524068 dated Jan. 4, 2018.

* cited by examiner

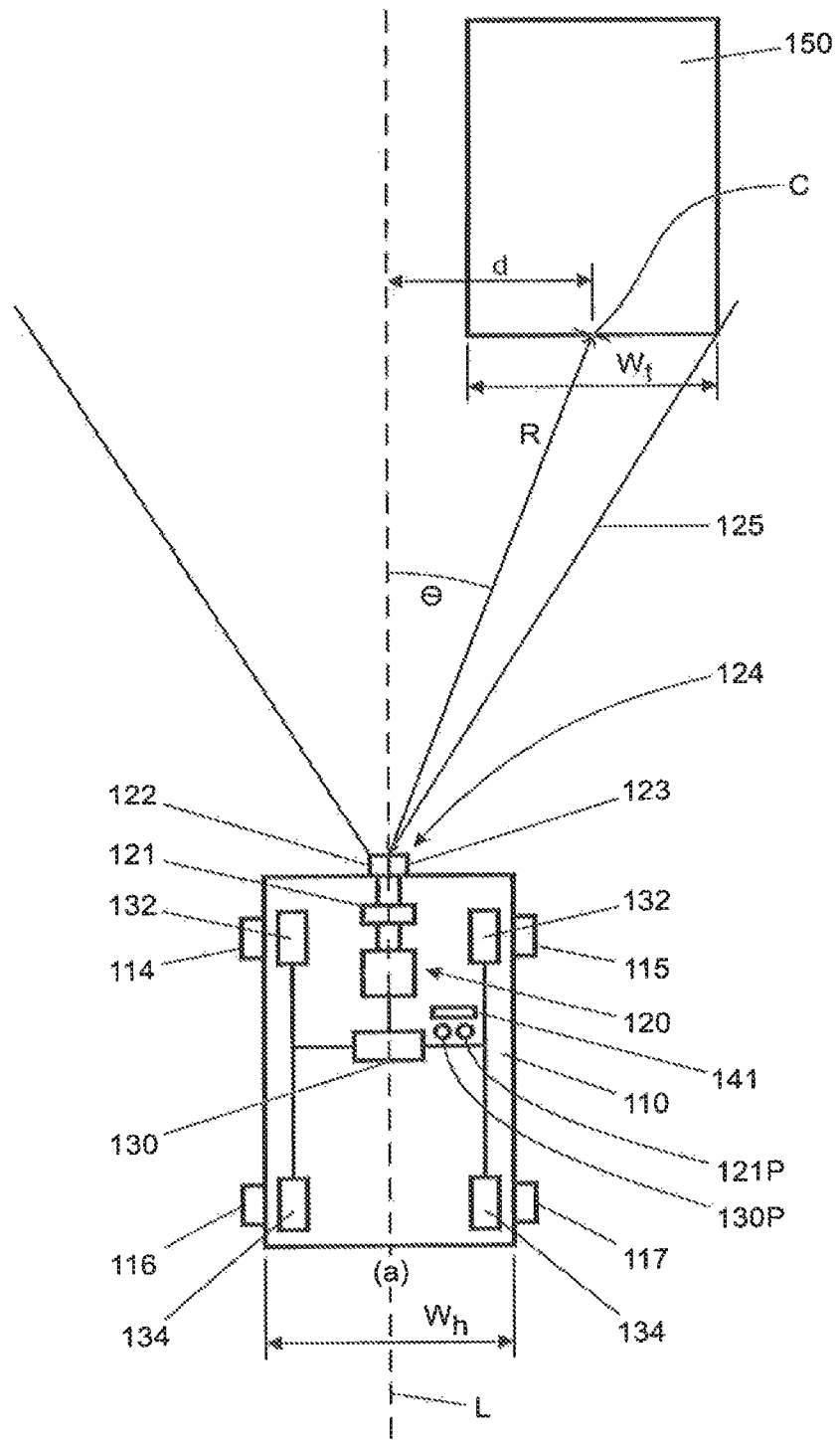

MONITORING APPARATUS AND METHOD

CROSS REFERENCE TO RELATED APPLICATIONS

This application is a continuation of U.S. patent application Ser. No. 14/116,181, filed on Feb. 3, 2014, which is the national stage application of International Application No. PCT/EP2012/058700, filed on May 10, 2012, which claims priority to United Kingdom Application No. GB 1107920.9, filed on May 12, 2011, all of which are incorporated herein by reference

TECHNICAL FIELD

The present invention relates to apparatus and a method for monitoring a target object external to a vehicle.

BACKGROUND

It is known to provide a vehicle having apparatus arranged to identify target objects in front of or behind the vehicle and to activate automatically a braking system of the vehicle if the vehicle determines that collision with the object is imminent.

Such systems typically employ radar or ultrasonic transmitter/receiver modules. The well known Doppler effect is used to determine a range and rate of change of range (or 'range rate') of the object from the vehicle.

It is desirable to provide improved apparatus to increase the likelihood that the apparatus will correctly identify a target object that represents a collision risk to the vehicle and take appropriate action in a given situation.

SUMMARY

Embodiments of the invention may be understood with reference to the appended claims.

Aspects of the present invention provide an apparatus, a vehicle and a method.

In one aspect of the invention for which protection is sought there is provided an apparatus for monitoring one or more target objects in an environment external to a host vehicle by means of at least one sensor, the apparatus being arranged to monitor a speed of a host vehicle and relative movement between a host vehicle and the one or more target objects, the apparatus being arranged to trigger at least one action responsive to a speed of a host vehicle and detection of predetermined relative movement between a host vehicle and the one or more target objects thereby to reduce a risk of collision of a host vehicle with the one or more target objects, the apparatus being further arranged to monitor one or more control inputs of a host vehicle, in the event predetermined movement of one or more of the control inputs is detected the apparatus being arranged to over-ride triggering of the at least one action whereby triggering of the at least one action is not performed.

The apparatus may take the form of a system, such as a monitoring system. Embodiments of the invention have the advantage that if the driver performs the predetermined movement in an attempt to avert a collision the apparatus will not intervene and seek to avert a collision.

In a further aspect of the invention for which protection is sought there is provided an apparatus for monitoring one or more target objects in an environment external to a host vehicle by means of at least one sensor, the apparatus being arranged to trigger at least one action responsive to the detection of prescribed relative movement between a host vehicle and the one or more target objects, wherein the apparatus is arranged to monitor one or more control inputs of a vehicle and to over-ride triggering of the at least one action such that triggering of the at least one action is not performed in the event that a prescribed movement of one or more control inputs is detected.

Optionally the apparatus is arranged to trigger the at least one action responsive to the detection of prescribed relative movement between a host vehicle and the one or more target objects in dependence on a speed of a host vehicle.

The apparatus may be arranged to monitor movement of a steering wheel of a vehicle.

Further advantageously, in the event a steering wheel is turned at a rate exceeding a prescribed rate the apparatus is arranged to over-ride triggering of the at least one action.

Optionally, in the event a steering wheel is turned beyond a prescribed angle relative to a reference position the apparatus is arranged to over-ride triggering of the at least one action.

The reference position may be a position of a steering wheel corresponding to movement of a vehicle in a substantially straight forward direction.

Further advantageously the apparatus is arranged to monitor movement of an accelerator control of a vehicle.

Optionally, in the event an accelerator control moves at a rate the magnitude of which exceeds a prescribed rate the apparatus is arranged to over-ride triggering of the at least one action.

Further optionally the apparatus may be arranged to over-ride triggering of the at least one action when an accelerator control moves at a rate the magnitude of which exceeds a first prescribed rate in a direction to increase an amount of power developed by a powertrain of a vehicle.

The apparatus may be arranged to over-ride triggering of the at least one action when an accelerator pedal is moved at a rate the magnitude of which exceeds a second prescribed rate in a direction to decrease an amount of power developed by a powertrain.

The first and second rates may be substantially the same. Alternatively the first prescribed rate may be greater than the second. Further alternatively the second prescribed rate may be greater than the first The apparatus may be further configured to perform a brake pre-arm operation when an accelerator control is moved at a rate the magnitude of which exceeds a third prescribed rate in a direction to decrease an amount of power developed by a powertrain, the brake-pre-arm operation being an operation in which a pressure of brake fluid of a vehicle is increased thereby to reduce an amount of time taken to slow a vehicle if the brake pressure is subsequently increased, thereby to retard movement of a vehicle.

This feature allows the apparatus to predict when a driver may be about to apply the brakes of a vehicle and pre-arm the brakes so that braking action is experienced more quickly when the driver applies the brakes.

Optionally the third prescribed rate and the second prescribed rate are substantially the same.

Alternatively the third prescribed rate and the second prescribed rate may be different.

The third prescribed rate may be greater than the second prescribed rate. Alternatively the third prescribed rate may be less than the second prescribed rate.

Optionally, in the event the accelerator control is depressed beyond a prescribed position the apparatus is arranged to over-ride triggering of the at least one action.

Thus if the driver of the vehicle performs a 'kick-down' action in which an accelerator control (such as a pedal) is fully depressed (or almost fully depressed, for example at least 95% depressed or at least 90% depressed).

The apparatus may be arranged to monitor or detect movement of a brake control of a vehicle.

Optionally, in the event a brake control is depressed at a rate exceeding a prescribed rate the apparatus is arranged to over-ride triggering of the at least one action.

Further optionally, in the event the brake control is depressed beyond a prescribed position the apparatus is arranged to over-ride triggering of the at least one action.

Further optionally the at least one action comprises triggering application of one or more brakes of a vehicle thereby to slow a vehicle.

The at least one action may comprise pre-arming of one or more brakes of a vehicle when certain predetermined movement of one or more control inputs is detected, and triggering of application of one or more brakes when certain other predetermined movement of one or more control inputs is detected.

Optionally the at least one action may comprise reducing an amount of power delivered to at least a portion of a driveline of a vehicle by a propulsion motor.

The at least one action may comprise reducing an amount of power delivered to one or more wheels of a vehicle by a powertrain.

The at least one action may comprise reducing an amount of power developed by one or more propulsion motors of a vehicle.

In a further aspect of the invention there is provided a vehicle comprising apparatus according to the preceding aspect.

The accelerator control of the vehicle may comprise an accelerator pedal.

The brake control may comprise a brake pedal.

In one aspect of the invention for which protection is sought there is provided a method of monitoring one or more target objects in an environment external to a vehicle by means of at least one sensor, the method comprising: triggering at least one action responsive to the detection of prescribed relative movement between the host vehicle and the one or more target objects; monitoring or detecting one or more user control inputs of the vehicle; and over-riding triggering of the at least one action such that triggering of the at least one action is not performed in the event that prescribed movement of one or more of the control inputs is detected.

Optionally the step of triggering the at least one action responsive to the detection of prescribed relative movement between the host vehicle and the one or more target objects comprises triggering the at least one action in further dependence on the speed of the host vehicle.

The step of triggering the at least one action may comprise the step of triggering a brake pre-arming operation in which pre-arming of one or more brakes of the vehicle is performed.

Alternatively or in addition the step of triggering the at least one action comprises the step of triggering an operation in which application of one or more brakes of the vehicle takes place thereby to slow the vehicle.

According to another aspect of the invention for which protection is sought there is provided a method of monitoring one or more target objects in an environment external to a vehicle by means of at least one sensor, the method comprising monitoring a speed of the host vehicle and relative movement between the host vehicle and the one or more target objects, and triggering at least one action responsive to the speed of the host vehicle and detection of predetermined relative movement between the host vehicle and the one or more target objects thereby to reduce a risk of collision of the host vehicle with the one or more target objects, the method comprising monitoring one or more user control inputs of the vehicle, in the event predetermined movement of one or more of the control inputs is detected the method comprising over-riding triggering of the at least one action whereby triggering of the at least one action is not performed.

The accelerator control may comprise an accelerator pedal.

In one aspect of the invention there is provided apparatus arranged to monitor or detect movement of an accelerator control of a vehicle, the apparatus being arranged to perform a brake pre-arm operation when an accelerator control is moved at a rate the magnitude of which exceeds a first prescribed rate in a direction to decrease an amount of power delivered to one or more wheels by a powertrain of a vehicle, the brake-pre-arm operation being an operation in which a pressure of brake fluid of a vehicle is increased thereby to reduce an amount of time taken to slow a vehicle if brake pressure is subsequently increased.

The apparatus may be arranged to monitor one or more target objects in an environment external to a host vehicle by means of at least one sensor, the apparatus being arranged to trigger at least one action responsive to the detection of prescribed relative movement between a host vehicle and the one or more target objects.

The apparatus may be arranged to over-ride triggering of the at least one action when an accelerator control is moved at a rate exceeding a second prescribed rate in a direction to decrease the amount of power delivered to the one or more wheels by a powertrain.

The first prescribed rate and the second prescribed rate may be substantially the same.

Optionally the first prescribed rate is less than the second prescribed rate.

Alternatively the first prescribed rate may be greater than the second prescribed rate.

The at least one action may comprise increasing a pressure of brake fluid thereby to slow a vehicle.

Alternatively or in addition the at least one action may comprise decreasing an amount of power delivered to one or more wheels of a vehicle by a powertrain of a vehicle.

In another aspect of the invention for which protection is sought there is provided an apparatus for monitoring one or more target objects in an environment external to a host vehicle by means of at least one sensor, the apparatus being arranged to trigger at least one action responsive to the detection of prescribed relative movement between a host vehicle and the one or more target objects, wherein the apparatus is arranged to monitor one or more control inputs of a vehicle and to over-ride triggering of the at least one action such that triggering of the at least one action is not performed in the event that a prescribed movement of one or more control inputs is detected, wherein the apparatus is arranged to monitor or detect movement of an accelerator control of a vehicle, the apparatus being arranged to perform a brake pre-arm operation when an accelerator control is moved at a rate the magnitude of which exceeds a second prescribed rate in a direction to decrease an amount of power developed by a powertrain, the brake-pre-arm operation being an operation in which a pressure of brake fluid of a vehicle is increased thereby to reduce an amount of time taken to slow a vehicle if the brake pressure is subsequently increased.

Within the scope of this application it is envisaged that the various aspects, embodiments, examples, features and alternatives set out in the preceding paragraphs, in the claims and/or in the following description and drawings may be taken independently or in any combination. Features described with reference to one embodiment are applicable to all embodiments, unless there is incompatibility of features.

BRIEF DESCRIPTION OF THE DRAWINGS

At least one embodiment will now be described, by way of example only, with reference to the accompanying FIGURE in which:

FIG. 1 is a schematic illustration of apparatus according to an embodiment of the present invention installed in a motor vehicle.

DETAILED DESCRIPTION

In one embodiment of the invention a monitoring apparatus 120 is provided in a host motor vehicle 110 as shown in FIG. 1. The monitoring apparatus 120 has a radar module 121 arranged to identify the presence of a target object 150 ahead of the vehicle 110 such as a vehicle 150. The radar module 121 is arranged to determine the range R of the object 150 from the vehicle 110 and the rate of change of the range, R' (or 'range rate').

The monitoring apparatus 120 forms a part of an intelligent emergency braking system (IEB) of the vehicle. The apparatus 120 is operable to control a braking system of the vehicle to slow or stop the vehicle in the event that certain prescribed conditions are met. The apparatus 120 is therefore coupled to a brake controller 130 of the vehicle. The brake controller 130 is in turn arranged to control the braking system of the vehicle 110 responsive to an input from the apparatus 120 or a driver-operated brake pedal 130P.

The braking system includes a pair of front brakes 132 and a pair of rear brakes 134. The front brakes 132 are arranged to apply a braking action to a pair of front wheels 114, 115 of the vehicle 110 whilst the rear brakes 134 are arranged to apply a braking action to a corresponding pair of rear wheels 116, 117 of the vehicle 110.

The brakes 132, 134 are brakes of the type having a brake pad and a brake disc. Braking action is obtained by urging the brake pad against the brake disc.

The brake controller 130 is operable to control the front brakes 132 and rear brakes 134 to execute a braking action by increasing a pressure of brake fluid in brake fluid lines of the vehicle 110.

It is to be understood that when a pressure of brake fluid in the braking system is increased initially, the brake pad of each brake 132, 134 moves into contact with the corresponding disc of the brake 132, 134. Initial, relatively light contact by the pad may be referred to as 'kissing' of the disc.

With further increasing brake fluid pressure the pads are urged against the discs with increasing force, causing the brakes 132, 134 to provide the required braking action.

The brake controller 130 is operable to increase the pressure of brake fluid in the brake lines sufficiently to cause the brake pad of each brake 132, 134 to move into contact with the corresponding disc of the brake 132, 134 but without causing noticeable braking action. This operation may be referred to as 'pre-arming' of the brakes, or a 'pre-arm operation'. Once in the 'pre-armed' state, braking action may be effected more rapidly by the braking system when the brake controller 130 subsequently begins to increase the pressure of brake fluid in the brake lines.

The monitoring apparatus 120 is operable to provide either a first or a second alert signal to the brake controller 130. If the first alert signal is provided, the brake controller 130 performs the pre-arm operation described above.

If the second alert signal is provided, the brake controller 130 is arranged to apply the brakes 132, 134 to decelerate the vehicle 110.

The apparatus 120 is arranged to provide the first or second alert signals responsive to data in respect of the speed at which the host vehicle 110 is moving and detection of predetermined relative movement between the target object 150 and host vehicle 110. In one embodiment data in respect of host vehicle speed may be obtained by reference to data transmitted on a controller area network (CAN) bus of the vehicle 110. In alternative embodiments the data may be obtained by a direct feed from another controller, via a dedicated speed sensor or by any other suitable means. Other arrangements are also useful.

The radar module 121 of the apparatus 120 has a radar transmitter 122 and a radar receiver 123. In the embodiment of FIG. 1 the radar module 121 is a Delphi ESR (electronically scanning radar) module (Delphi, Troy, Mich.).

The radar module 121 is arranged to control the radar transmitter 122 to transmit a radar signal 125 ahead of the vehicle 110. The radar receiver 123 is arranged to detect portions of the radar signal 125 that are reflected back towards the vehicle 110 by objects ahead of the vehicle. The module 121 is configured to determine the range R of the objects ahead of the vehicle by measuring a phase difference between the radar signal 125 transmitted by the transmitter 122 and the signal received by the receiver 123. It is to be understood that in some embodiments a time of flight analysis of the reflected radar signal may be employed to determine the range of objects ahead of the vehicle.

The module 121 is further configured to determine the range rate R' of the objects based on a frequency of the radar signal detected by the receiver 123 relative to that of the radar signal transmitted by the transmitter 122. It is to be understood that the frequency will be different depending on the relative speeds of the vehicle 110 and objects detected by the module 121, a phenomenon known as the 'Doppler effect'.

In the embodiment of FIG. 1 the transmitter 122 and receiver 123 are provided in the form of a transmit/receive unit (TRU) 124. The TRU 124 is aligned with a longitudinal axis L of the vehicle 110 such that a field of view of the receiver 123 is substantially symmetrical about the axis L and the radar signal transmitted by the transmitter 122 is transmitted such that the beam irradiates a region ahead of the vehicle that is also substantially symmetrical about the axis L. Other arrangements are also useful.

The vehicle 110 has a steering wheel 141 arranged to allow steering of a pair of steerable front wheels 114, 115 of the vehicle. A brake pedal 130P is provided to actuate the brakes 132, 134 of the vehicle 110 as described above when the pedal 130P is depressed. An accelerator pedal 121P is provided to increase the amount of power developed by the engine when the pedal 121P is depressed.

The apparatus 120 is arranged to monitor movement of the steering wheel 141, brake pedal 130P and accelerator pedal 121P. In the event the apparatus 120 detects that the driver is performing an action that may be intended to avert a collision, the apparatus 120 is operable to over-ride automatic actuation of the brakes 132, 134 in order to avert a collision.

In the embodiment of FIG. 1, if the driver turns the steering wheel at a rate exceeding a prescribed rate the apparatus 120 does not allow automatic actuation of the brakes 132, 134. In some embodiments the prescribed rate corresponds to an angular speed of around 350° s$^{-1}$. Other angular speeds are also useful.

Similarly, if the steering wheel angle exceeds a prescribed value the apparatus 120 is arranged to over-ride automatic actuation of the brakes 132, 134. It is to be understood that by steering wheel angle is meant an angle through which the steering wheel 141 has been rotated relative to a reference position. The angle may be referred to as an 'absolute angle' in some arrangements since it corresponds to an actual angle of the steering wheel relative to a fixed reference position or datum, irrespective of the direction in which the wheel was turned from the reference position.

In the embodiment of FIG. 1 the reference position is the position of the steering wheel 141 corresponding to movement of the vehicle in a substantially straight line. In some embodiments the prescribed angle is up to around 30°. Other values of the prescribed angle are also useful.

Monitoring of movement of the steering wheel 141 is advantageous since it provides an early indication that a driver may be taking action to avert a collision. This is because the driver is constantly holding the steering wheel and can move his or her arms rapidly in response to a perceived danger. It is to be understood that monitoring of the steering wheel to determine when a driver takes action to change a course of the vehicle is advantageous over measurement of an effect of turning the steering wheel (such as a change in position of the steerable road wheels 114, 115 or a change in lateral acceleration of the vehicle) because a delay or lag typically occurs between movement of the steering wheel 141 and the corresponding effect. Thus a time required for the apparatus 120 to determine that the driver is attempting to change the course of the vehicle may be reduced.

The apparatus 120 is also arranged to over-ride automatic actuation of the brakes 132, 134 if it is determined that the brake pedal 130P has been depressed at a rate exceeding a prescribed rate. Such an action by the driver indicates that the driver may be taking action to avoid a collision. Furthermore, if the amount by which the brake pedal has been depressed exceeds a prescribed amount (such as 75%, 80%, 90%, 95% or any other suitable value) or if the brake fluid pressure exceeds a prescribed value, the apparatus is arranged to over-ride automatic actuation of the brakes 132, 134. In some embodiments brake pedal position may be determined responsive to the value of brake fluid pressure.

In some embodiments the apparatus 120 is responsive to brake fluid pressure in a master cylinder of the braking system. In some embodiments the apparatus 120 is responsive to brake fluid pressure in one or more other portions of the braking system in addition to or instead of the master cylinder of the braking system.

In some embodiments the apparatus 120 may be operable to over-ride automatic actuation of the brakes 132, 134 in the event that the driver-initiated rate of increase of brake fluid pressure in the master cylinder exceeds around 50 bar s$^{-1}$. In some arrangements the apparatus 120 may be operable to over-ride automatic actuation of the brakes 132, 134 if the driver-initiated rate of increase of the pressure exceeds this value for a prescribed period of time, such as a period of 100 ms. Other values of the rate of increase of fluid pressure are also useful. Other values of the prescribed period of time are also useful.

Furthermore, the apparatus 120 is arranged to over-ride automatic actuation of the brakes 132, 134 in the event that the accelerator pedal 121P moves at a rate exceeding a prescribed rate or is depressed beyond a prescribed position.

In some embodiments the prescribed rate of accelerator pedal movement is around 250% s$^{-1}$, that is, a distance corresponding to 250% of a distance of full travel of the pedal per second. In some embodiments the apparatus pedal measures the rate of pedal movement and if the rate of movement exceeds this value for a prescribed period, such as a period of 100 ms, the apparatus 120 is configured to over-ride automatic actuation of the brakes 132, 134 Other rates of movement of the accelerator pedal and other values of prescribed period are also useful.

It is to be understood that a relatively rapid rate of depression or release of the accelerator pedal 121P may be interpreted as indicative that a driver is responding to a situation in which a risk of collision is high.

For example, if a driver has depressed his or her foot on the accelerator pedal 121P, maintaining the pedal 121P in a depressed condition and subsequently lifts his or her foot such that the accelerator pedal position changes rapidly this may indicate that the driver intends to allow the vehicle to decelerate. This may therefore indicate that avoiding action is being taken by the driver to avert a collision.

Similarly, rapid depression of the accelerator pedal 121P also indicates the driver may be taking action to avert a collision. Furthermore if the position of the accelerator pedal 121P exceeds a prescribed position, for example a position corresponding to a depression of more than 90% or more than 95% of full depression, the apparatus may be arranged to over-ride automatic actuation of the brakes 132, 134 preventing automatic application of the brakes 132, 134.

As noted above, embodiments of the invention have the advantage that they reduce a risk that an intelligent emergency braking system (IEB) or the like applies automatically brakes of a vehicle in order to reduce a risk of a collision when a driver of the vehicle has already recognised the collision risk and has initiated avoiding action.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus, comprising:
   at least one sensor configured to detect one or more target objects in an environment external to a host vehicle; and
   a controller configured to:
   use an indication from the at least one sensor for determining when relative movement between the host vehicle and the one or more target objects is prescribed relative movement, monitor turning of a steering wheel of the host vehicle, and in response to determining that the relative movement is the prescribed relative movement, determine whether to initiate automatic actuation of a braking system of the host vehicle based upon a rate at which a driver of the host vehicle is turning the steering wheel including determining to override initiating the automatic actuation during a time while the rate at which the driver of the host vehicle is turning the steering wheel exceeds a prescribed rate corresponding to an angular speed of about 350° per second and determining to initiate the automatic actuation while the rate at which the driver of the host vehicle is turning the steering wheel is below the prescribed rate.

2. The apparatus as claimed in claim 1 wherein the controller is configured to determine whether to initiate automatic actuation of the braking system of the host vehicle in further dependence on a speed of the host vehicle.

3. The apparatus as claimed in claim 1 wherein, in the event the steering wheel is turned beyond a prescribed angle relative to a reference position, the controller is configured to override automatic actuation of the braking system while the steering wheel is turned beyond the prescribed angle relative to the reference position.

4. The apparatus as claimed in claim 3 wherein the reference position is a position of the steering wheel corresponding to movement of the host vehicle in a substantially straight forward direction.

5. The apparatus as claimed in claim 1, wherein automatic actuation of the braking system comprises pre-arming one or more brakes of the host vehicle.

6. The apparatus as claimed in claim 1, wherein automatic actuation of the braking system comprises applying one or more brakes of the host vehicle to slow the host vehicle.

7. A vehicle comprising the apparatus of claim 1.

8. A method, comprising:

detecting, using at least one sensor, one or more target objects in an environment external to a host vehicle;

determining when relative movement between the host vehicle and the one or more target objects is prescribed relative movement;

monitoring turning of a steering wheel of the host vehicle; and in response to determining that the relative movement is the prescribed relative movement, determining whether to initiate automatic actuation of a braking system of the host vehicle based upon a rate at which a driver of the host vehicle is turning the steering wheel including determining to override initiating the automatic actuation during a time while the rate at which the driver of the host vehicle is turning the steering wheel exceeds a prescribed rate corresponding to an angular speed of about 350° per second and determining to initiate the automatic actuation while the rate at which the driver of the host vehicle is turning the steering wheel is below the prescribed rate.

9. The method as claimed in claim 8, wherein determining whether to initiate automatic actuation of the braking system of the host vehicle is dependent on a speed of the host vehicle.

10. The method as claimed in claim 8, wherein automatically actuating the braking system comprises at least one of:

pre-arming one or more brakes of the host vehicle; and applying one or more brakes of the host vehicle to slow the host vehicle.

* * * * *